US010193973B2

(12) United States Patent
Larouche et al.

(10) Patent No.: US 10,193,973 B2
(45) Date of Patent: Jan. 29, 2019

(54) OPTIMAL ALLOCATION OF DYNAMICALLY INSTANTIATED SERVICES AMONG COMPUTATION RESOURCES

(71) Applicant: Ubisoft Entertainment, Rennes (FR)

(72) Inventors: Alexandre Larouche, Québec (CA);
Oleksandr Khilko, Québec (CA);
Jean-Michel Lacroix, Québec (CA)

(73) Assignee: Ubisoft Entertainment, Rennes (FR)

( * ) Notice: Subject to any disclaimer, the term of this patent is extended or adjusted under 35 U.S.C. 154(b) by 180 days.

(21) Appl. No.: 14/557,549

(22) Filed: Dec. 2, 2014

(65) Prior Publication Data

US 2016/0156715 A1    Jun. 2, 2016

(51) Int. Cl.
*G06F 15/16*     (2006.01)
*H04L 29/08*     (2006.01)
*G06F 9/48*      (2006.01)

(52) U.S. Cl.
CPC ........ *H04L 67/1097* (2013.01); *G06F 9/4881* (2013.01)

(58) Field of Classification Search
CPC ..... G06F 9/4881; G06F 9/48; H04L 67/1097; H04L 29/08
USPC ........................................................ 709/201
See application file for complete search history.

(56) References Cited

U.S. PATENT DOCUMENTS

| 9,274,830 | B2* | 3/2016 | Besbris | G06F 9/445 |
| 9,384,051 | B1* | 7/2016 | Chopra | G06F 9/5005 |
| 2006/0161563 | A1* | 7/2006 | Besbris | G06F 9/445 |
| 2006/0174252 | A1* | 8/2006 | Besbris | G06F 9/445 719/330 |
| 2006/0179430 | A1* | 8/2006 | Besbris | G06F 9/445 717/162 |
| 2011/0213884 | A1* | 9/2011 | Ferris | G06F 9/50 709/226 |
| 2014/0089509 | A1* | 3/2014 | Akolkar | H04L 41/147 709/226 |
| 2014/0222953 | A1* | 8/2014 | Karve | G06F 9/455 709/217 |

* cited by examiner

*Primary Examiner* — Tauqir Hussain
(74) *Attorney, Agent, or Firm* — Erise IP, P.A.

(57) ABSTRACT

Media are provided for performing methods of allocating tasks among computation resources in an optimal or near-optimal fashion. A method is disclosed for doing so which comprises the steps of receiving a request to instantiate a service which includes a task specification for that service; for each available computation resource, calculating a time metric for the specified task on the computation resource which incorporates a computation time and a transfer time; determining a computation resource based on the time metric calculated for each of the computation resources; selecting a bundle based on the service to be instantiated; and transmitting a message to a launcher running on the chosen computation resource that causes the launcher to instantiate the service on the chosen computation resource from the selected bundle.

16 Claims, 9 Drawing Sheets

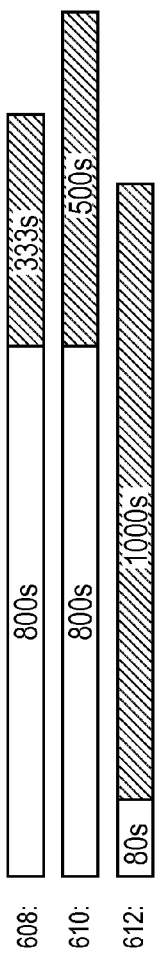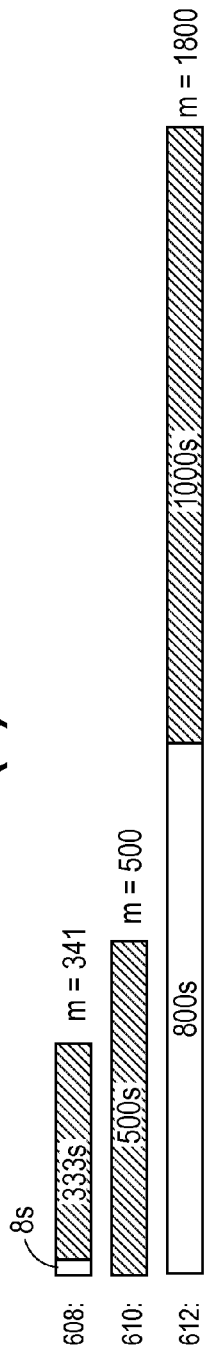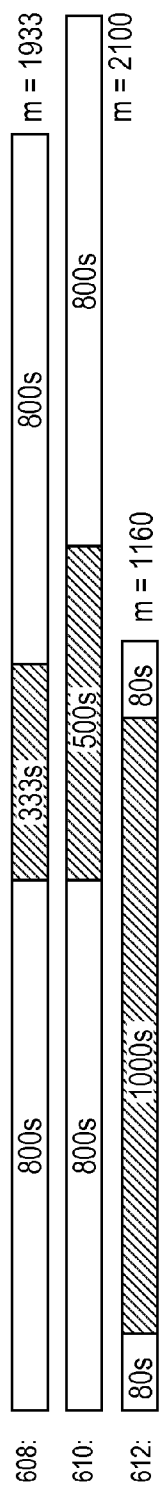
FIG. 7(a)
FIG. 7(b)
FIG. 7(c)

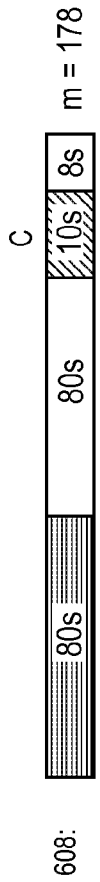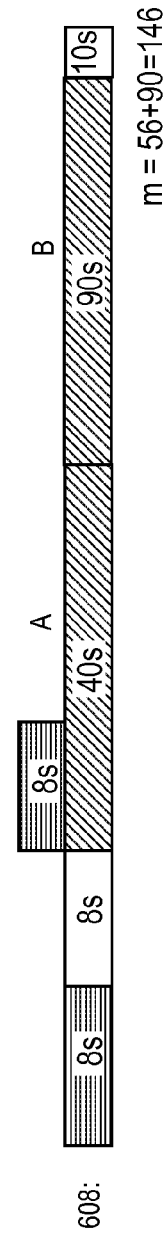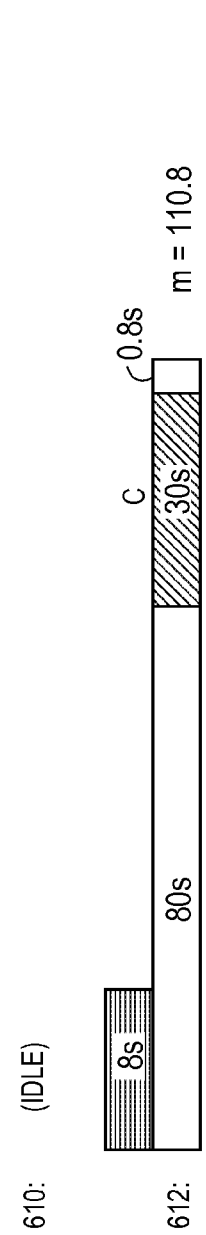
FIG. 7(d)
FIG. 7(e)

OPTIMAL ALLOCATION OF DYNAMICALLY INSTANTIATED SERVICES AMONG COMPUTATION RESOURCES

FIELD

Embodiments of the invention generally relate to cloud computing systems, and the distribution and scheduling of computing tasks therein.

BACKGROUND

In the field of cloud computing, users essentially rent computing capacity from large cloud-computing providers instead of owning and operating their own servers. This allows them to only have as much capacity as is needed at any given point and to scale the capacity as demand shrinks or grows. In some cases, this capacity is used for long-running servers that handle requests from customers. In other cases, it is used for discrete tasks that process some amount of input data, produce some amount of output data, and then terminate. In the former case, a sudden surge in demand may result in the current set of servers becoming overloaded, leading to a need to quickly spin up additional servers to handle the increase in demand. In the latter case, the capacity may only be needed while the task is running.

Each of these scenarios presents its own challenges in selecting the appropriate place (be it cloud computing provider, data center, or specific server) to add additional capacity when it is needed. For example, if additional web server capacity is needed, then the server may need to run not only a web server, but also a database front-end and several plugins, each of which may need to be of a particular version to operate with the website code. Furthermore, each of these packages may only run on particular types of hardware, or may have different versions for different types of hardware. Thus, there is a need for a system that can automatically resolve dependencies between packages, retrieve the appropriate software packages, and launch them on an appropriate platform.

Data processing tasks have a different set of challenges: these tasks may perform computationally intensive processing on large amounts of data. This means that such tasks are typically scheduled on high-performance hardware. However, increasing the hardware requirements for a task reduces the set of candidate platforms on which that task can run. Accordingly, the platform selected may be much further (in a network bandwidth sense) from the source of the data on which it will operate, which means that running a task on higher performance hardware can actually take longer due to increased data transfer times. Thus, there is a need for a task allocation algorithm that can take into account not only the time needed to execute a task on a potential platform but also the need to transfer the data to and from that platform.

SUMMARY

At a high level, embodiments of the invention relate to the allocation of dynamically instantiated services among computation resources. In a first aspect of embodiments of the invention, a method is disclosed which comprises the steps of receiving a request to instantiate a service; determining a target platform; selecting a bundle based on the service to be instantiated; and transmitting a message to a launcher running on the target platform indicating the selected bundle and causing the launcher to instantiate the service on the target platform.

In a second aspect of embodiments of the invention, a method is disclosed which comprises the steps of receiving a task specification; for each available computation resource, calculating a time metric for the specified task on the computation resource incorporating a computation time and a transfer time; determining a chosen computation resource based on the time metric calculated for each computation resource; and executing the specified task on the chosen computation resource.

In a third aspect of embodiments of the invention, a method is disclosed which comprises the steps of receiving a request to instantiate a service which includes a task specification for that service; for each available computation resource, calculating a time metric for the specified task on the computation resource which incorporates a computation time and a transfer time; determining a computation resource based on the time metric calculated for each of the computation resources; selecting a bundle based on the service to be instantiated; and transmitting a message to a launcher running on the chosen computation resource that causes the launcher to instantiate the service on the chosen computation resource from the selected bundle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 6:
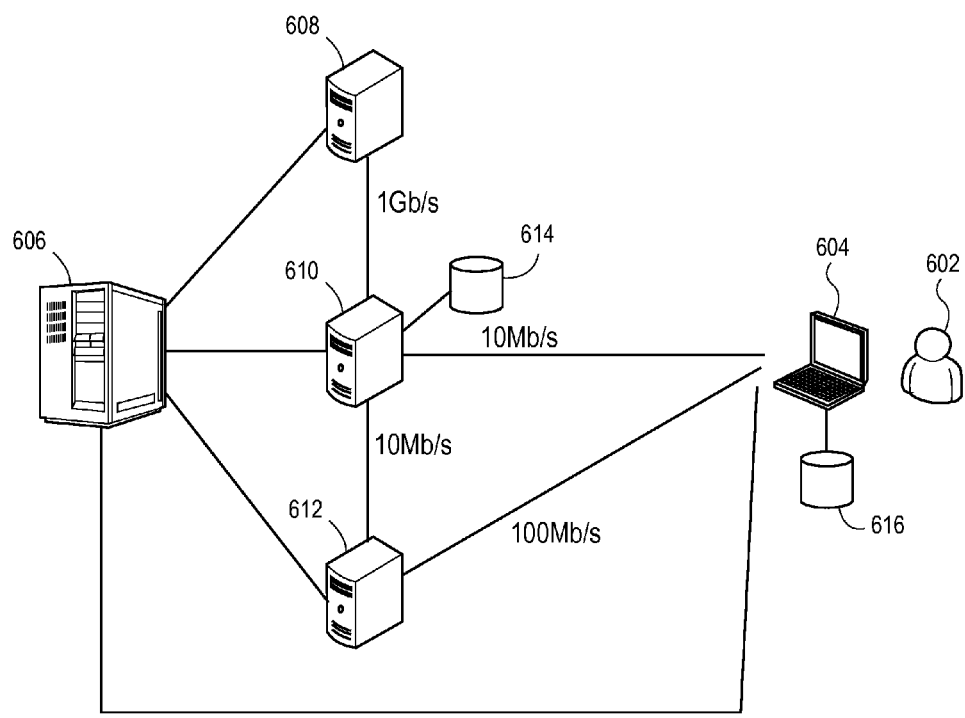
FIG. 6 depicts an alternate view of the exemplary network architecture suitable for practicing certain embodiments of the invention.
Figure 8:
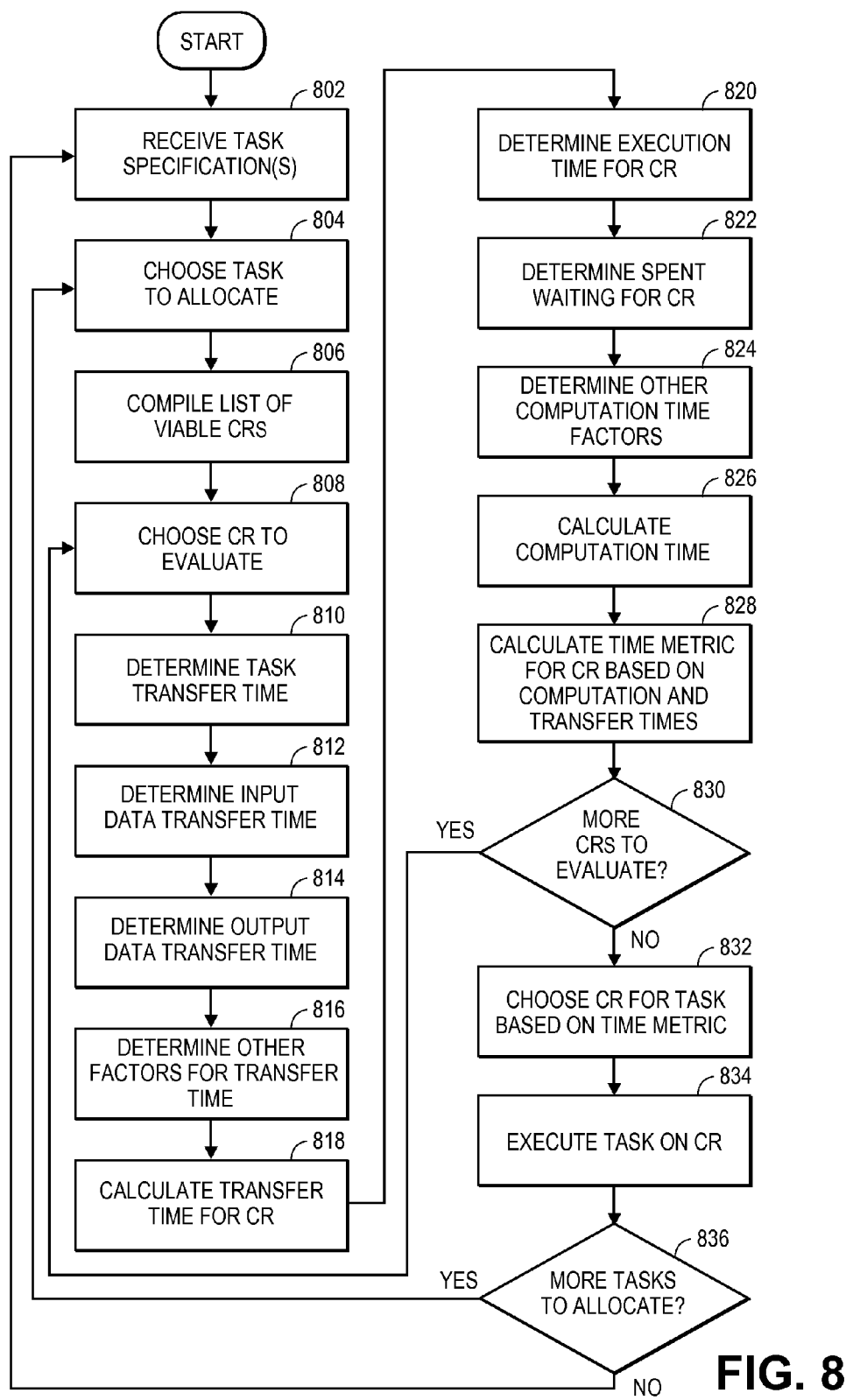

FIGS. 7(*a*)-7(*e*) depict a variety of task allocations generated by one embodiment of the invention operating in the environment of FIG. 6; and FIG. 8 depicts a flowchart illustrating the operation of the task allocator of one embodiment of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements;

however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Embodiments of the invention may be embodied as, among other things a method, system, or set of instructions embodied on one or more computer-readable media. Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Figure 1:
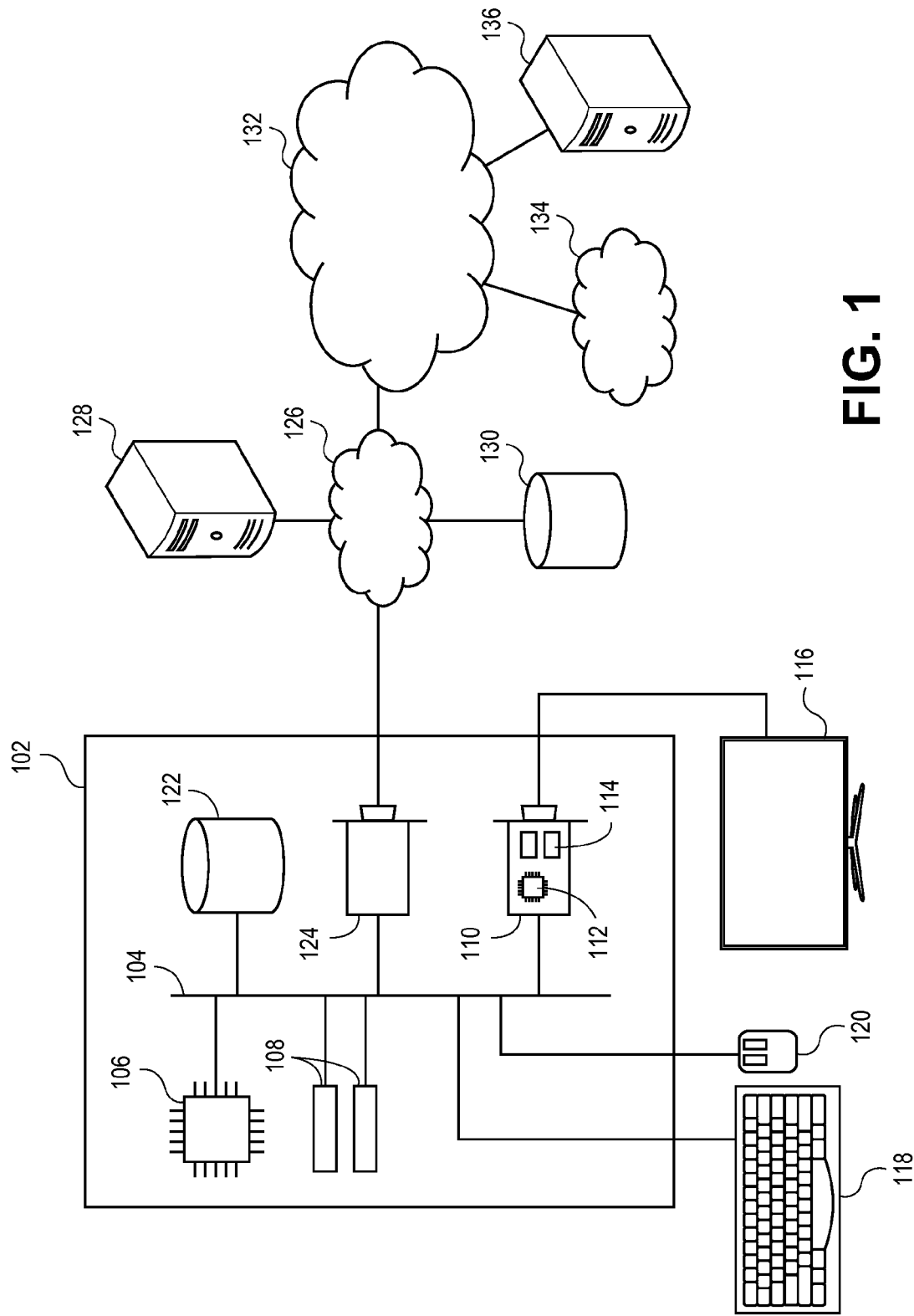
FIG. 1 depicts an exemplary hardware platform forming one element of certain embodiments of the invention.

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. In certain embodiments, a computer such as computer 102 may have multiple CPUs, either in the form of multiple discrete chips or multiple cores on the same chip. Each CPU or CPU core operates at a particular frequency, which may vary over time. The number and frequency of CPU cores is one factor that determines the speed at which computer 102 can process data, and may be the subject of hardware requirements for tasks, as discussed below. Also attached to system bus 104 are one or more random-access memory (RAM) modules 108. The amount of RAM present in computer 102 is another factor that determines that rate at which it can process data and also may be the subject of hardware requirements.

Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. The presence and characteristics of GPU 112 and GPU memory 114 are also factors impacting the speed at which computer 102 can process data and may be the subject of hardware requirements. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Finally, network interface card (NIC) 124 is also attached to system bus 104 and allows computer 102 to communicate over a network such as network 126. NIC 124 can be any form of network interface known in the art, such as Ethernet, ATM, fiber, or Wi-Fi (i.e., the IEEE 802.11 family of standards). NIC 124 connects computer 102 to local network 126, which may also include one or more other computers, such as computer 128, and network storage, such as data store 130. Local network 126 is in turn connected to Internet 132, which connects many networks such as local network 126, cloud-computing providers such as cloud-computing provider 134 or directly attached computers such as computer 136. In some embodiments, computer 102 can itself be directly connected to Internet 132.

Figure 2:
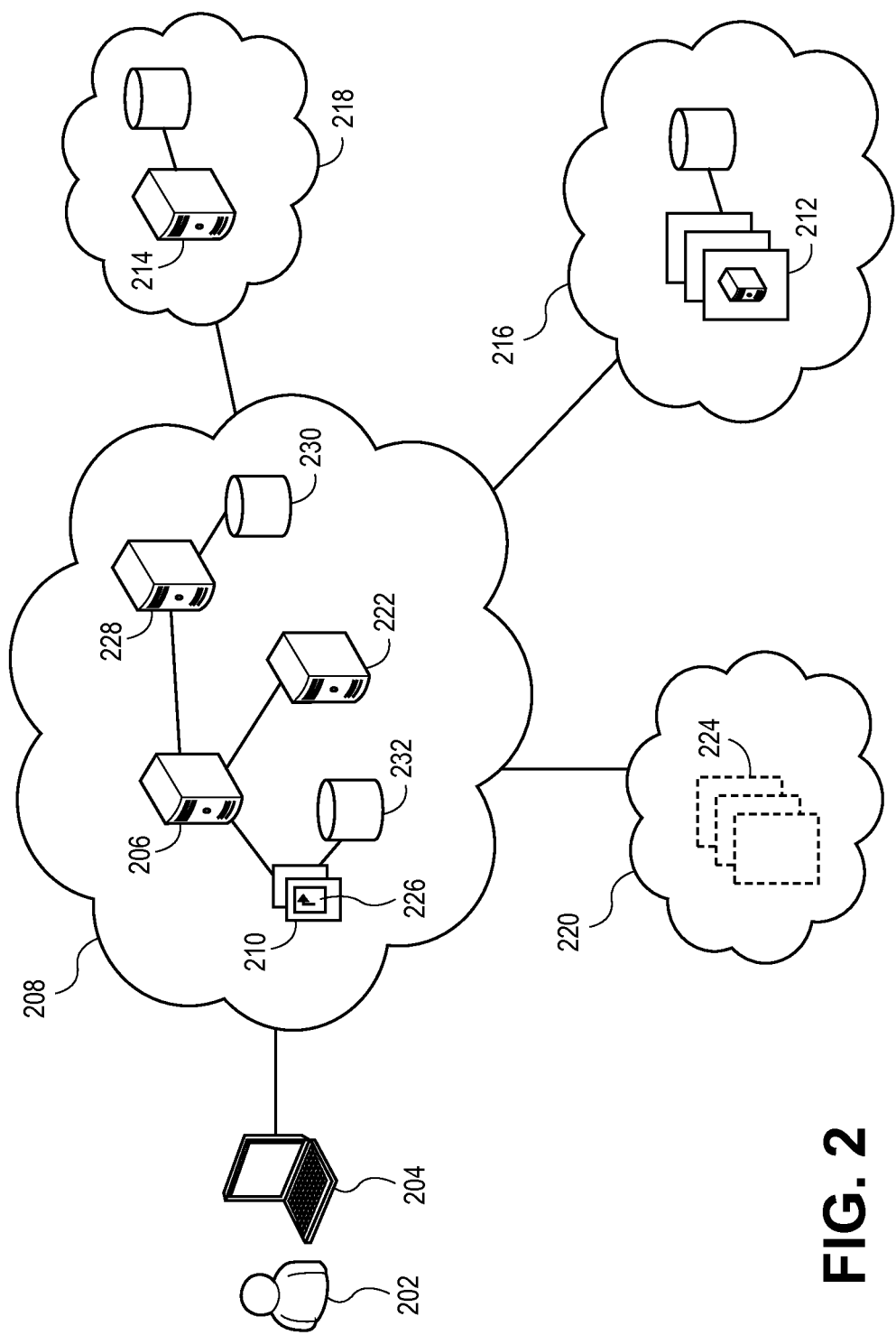
FIG. 2 depicts an exemplary network architecture suitable for practicing certain embodiments of the invention.

Turning next to FIG. 2, an exemplary network architecture suitable for practicing certain embodiments of the invention is depicted. The process of dynamically instantiating a service begins with a request to instantiate a service. In some cases, a user such as user 202 will manually cause computer 204 to send a request to instantiate a service. In other cases, computer 204 will automatically send the request to instantiate a service in response to some stimulus without user input. Examples of such stimuli include the detection that another instance of a service is heavily loaded, a predetermined time, a delegation of part or all of a computation task, and instructions from another service to instantiate the service in question.

Generally, the term "service," as used here, refers to a computer program or set of programs that execute on computer hardware or in an interpreter or virtual machine.

Services can be long-running or perform a discrete set of processing tasks and then terminate. Examples of services include a web server, a database front-end server, a JavaScript script, a rendering job, and a software build process. Tracker 206 in network 208 receives requests to instantiate a service. Although FIG. 2 depicts only a single tracker, other embodiments of the invention include a replicated tracker, a distributed tracker, and multiple independent trackers. It is an advantage of the invention that the tracker can itself be a service, such that additional trackers (or other components of the invention, as described below) can be instantiated in times of high demand and destroyed when no longer needed, thus allowing the invention itself to scale appropriately with demand.

The request received by tracker 206 indicates the service to be instantiated. In some embodiments, the request can include additional information about the service, such as a desired version of the service to be instantiated. Examples of such requirements include requiring a particular version, requiring a version no older (or no newer) than a specified version, or requiring the latest version. In other embodiments, the request includes requirements about the platform on which the service is to run. Examples of these requirements include a requirement for a particular operating system or version of an operating system, a requirement for a certain CPU frequency or number of CPU cores, a requirement for a minimum amount of RAM, or local data storage, and a requirement for particular processing hardware (such as a GPU). In still other embodiments, a requirement may be included that the platform have certain data (for example, the data to be processed) stored locally. A related type of requirement is a locality requirement, which requires that the service be run on a platform according to the location of a platform running another service. For example, a service may be required to run on the same platform as another service. This may be necessary due to a requirement for low latency communication with the other service. Another form of locality requirement is that a service be run on the same local-area network (such as LAN 126) as another service. This can still allow low latency but allow more computing resources than a requirement that the services run on the same platform. In another form of locality requirement, the maximum latency between the platforms running the two services is specified, and the two services can be run on the same platform, the same LAN, or different LANs, as long as this latency requirement is met.

Once it receives the request, tracker 206 determines a suitable target platform such as platform 210, platform 212, or platform 214. In some embodiments, the target platform could be part of the same local area network as tracker 206, such as platform 210. In other embodiments, the target platform could be part of another network, such as network 216, network 218, or network 220. Furthermore, the target platform could be of various types depending on service requirements and platform availability. For example, the target platform could be a virtual machine platform such as platform 210, an interpreter platform such as platform 212, or a hardware platform such as platform 214. It will be apparent to a person of skill in the art that each type of platform has advantages and disadvantages. Depending on the number of potential target platforms, determining the optimal target platform may be simple or quite complex. One method of allocation of services among target platforms is discussed below It may further be the case that no suitable target platform is available, or that the best type of platform is not available. In this case, it may be desirable to spawn a new platform. To do this, tracker 206 communicates with provisioner 222. Although FIG. 2 depicts provisioner as separate hardware on the same network as tracker 206, it may be the case that provisioner 222 runs on the same platform as tracker 206, or that it is on a different network. It is the responsibility of provisioner 222 to create new platforms on demand. Thus, for example, provisioner 222 may communicate with a cloud-computing provider to spawn a new virtual machine such as virtual machine 224, which can be used as a target platform once spawned. Similarly, provisioner 222 is responsible for spawning a new interpreter on a target platform if an interpreter platform is needed but not available. In some embodiments, the provisioner may spawn new platforms proactively (for example, in response to an increase in demand that has not yet resulted in a request that cannot be satisfied). In some such embodiments, the provisioner spawns new platforms independently; in others, the tracker proactively instructs the provisioner to spawn new platforms.

Once the target platform as been selected (and, if necessary, spawned), the tracker can begin the process of instantiating the service on that target platform. To do this, the tracker communicates with the launcher running on the target platform, such as launcher 226. In certain embodiments, the launcher is itself a persistent service running on the target platform. In other embodiments, the launcher is a process running on the target platform that executes the service itself, resumes its launcher functionality when the service terminates in order to clean up after the service, and then terminates. In still other embodiments, the launcher is part of the base virtual machine image spawned by the system. It is generally the responsibility of launcher 226 to retrieve all the programs and data required by the service (if necessary) and then to instantiate the service. In some embodiments it is also the responsibility of the launcher to communicate information such as service startup and termination to tracker 206, and to clean up after the service if and when it terminates by transferring any output data to its destination.

When tracker 206 communicates with a launcher such as launcher 226, it indicates the service to be instantiated. Where multiple versions of the service are available, a particular version must be selected to be instantiated. In some embodiments, the tracker selects a version from those meeting requirements. In other embodiments, the launcher selects a version from those meeting requirements. Once a version has been selected, the corresponding bundle must be retrieved if necessary. A bundle generally comprises two things: a package including those files necessary for a particular service to execute, and a manifest containing metadata about the package. Such metadata can include (but is not limited to) service name, package version, package access control lists (ACLs), package type (shared library, executable, script, etc.), supported platform types, entry point (points to a specific file in the package file based on the type and the supported platform), and a set of key-value pairs that will be available to the service to fetch when installed.

Bundles are centrally stored at repository 228. In FIG. 2, only a single repository is depicted, and repository 228 is shown as being on separate platform on the same network as tracker 206. In other embodiments, however, there may be more than one repository, arranged in a replicated, distributed or hierarchical configurations, or repository 228 may run on the same platform as tracker 206. In some embodiments, repository 228 will include or communicate with local storage such as data store 230. In such embodiments, data store 230 stores the bundles, while repository 228 brokers requests from launchers such as launcher 226 for bundles, retrieves the appropriate bundle from data store 230 and transmits it to launcher 226. Repository 228 may store a number of different versions of each bundle, and provide different versions to different launchers as requested.

In certain embodiments, platforms also maintain caches such as cache 232 of recently launched bundles. In such embodiments, launcher 226 first checks the cache 232 to see if it contains a locally stored copy of the bundle prior to requesting it from repository 228. In some such embodiments, if a local copy is present, it is used to instantiate the requested service. In other embodiments, launcher 226 communicates with the repository 228 to ensure that the locally cached bundle has not been invalidated. In some embodiments, each platform has its own cache. In other embodiments, the platforms on the same network share a common cache. In still other embodiments, there are multiple levels of cache, forming a hierarchy with the repository as the master copy. In some embodiments where a provisioner creates additional platforms on demand, the provisioner is additionally responsible for creating a new cache for the use of that platform. In some such embodiments, the cache may be created empty, while in others it may be prepopulated with one or more bundles.

Bundle manifests may additionally specify dependencies, such as other bundles that are required for the service to operate. As part of the launch process, launcher 226 may automatically retrieve and instantiate bundle dependencies, and such dependencies may have dependencies in turn. Persons of ordinary skill in the art will appreciate that well-understood dependency management techniques can be used to resolve these dependencies, which can then be fetched and instantiated locally by launcher 226 or remotely by tracker 206 and another launcher.

Some services may additionally require data upon which to operate and/or provide output data. In some embodiments, it is the further responsibility of the launcher to retrieve the necessary input data from where it is stored and make it available to the service. Such data may be stored within the network containing the tracker which caused the launcher to instantiate the service, another network on which the invention, or elsewhere on a publically or privately accessible network. In other embodiments, it is the responsibility of the launcher to collect the output data of the service and deliver it to its destination. This destination may be the user 202 who initially requested that the service be launched, or it may be another service that will operate on the data as input, or it may be a local or remote data store for later retrieval.

Figure 3:
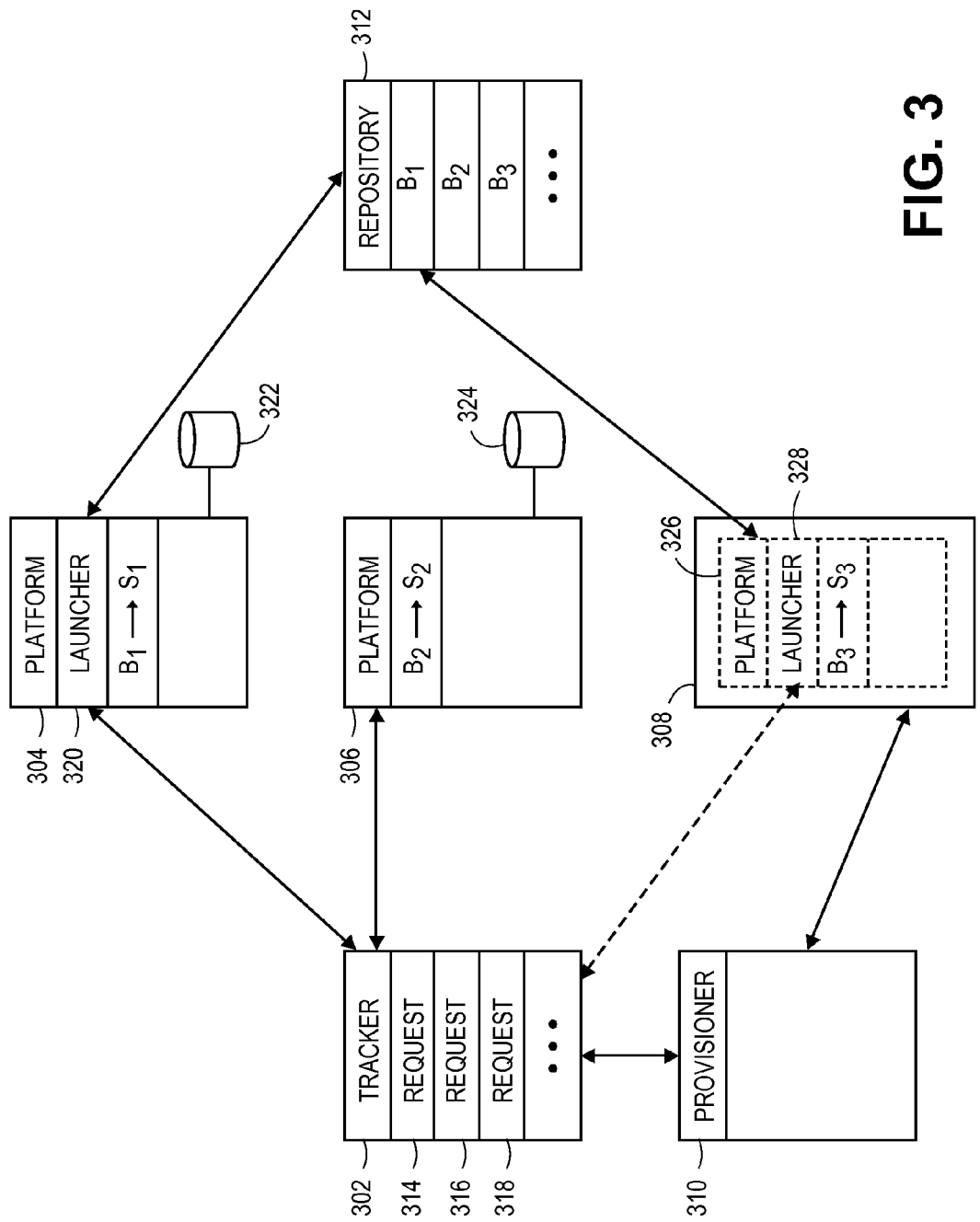
FIG. 3 depicts an illustrative communication among certain elements of a particular embodiment of the invention.

Turning now to FIG. 3, an illustrative communication among certain elements of one particular embodiment of the invention is depicted. Initially, tracker 302 (corresponding to tracker 206 of FIG. 2) is tracking two potential target platforms, platforms 304 and 306 (each corresponding to platform 210, 212 and 214 of FIG. 2). Also present are cloud-computing provider 308, which initially has no platforms spawned, provisioner 310 (resp. provisioner 222), and repository 312 (resp. repository 228).

As operation proceeds, tracker 302 receives request 314 and request 316. As discussed above, these requests may be from a variety of sources, and may be related to each other or unrelated. Processing request 314 first, tracker 302 determines platform 304 to be the target platform. Tracker 302 then communicates to launcher 320 the bundle information and any other information relevant to instantiating the requested service. Launcher 320 then checks its local cache 322 to see if it contains the requested bundle (here, B1). In this instance it does not, so launcher 320 requests B1 from repository 312 and repository 312 responds with the requested bundle. Launcher 320 stores bundle B1 in its cache for future use, unpacks it and instantiates service S1 from the package and manifest information contained in bundle B1. In this instance, service S1 is a short-running processing task that generates output data when it completes. Launcher 320 collects this output data and transmits it to tracker 302, which can provide it to the requesting user or service, which will perform further processing as needed.

Concurrently, tracker processes request 316. Here, platform 306 is selected as the target platform. Unlike platform 304, platform 306 does not have a launcher process running. Instead, tracker 302 directly executes a shell process on platform 306. This shell process performs the launcher tasks associated with request 316 and then executes the requested service directly in its place. Further requests to platform 306 will each spawn a new shell process. As launcher 320 did for request 314, the shell process for request 316 checks cache 324 to see if the requested bundle B2 is present. In this instance, cache 324 does contain bundle B2, perhaps because platform 306 has instantiated the corresponding service before. The shell process retrieves bundle B2 from the cache, unpacks it, and begins instantiating service S2 from the package and manifest information it contains.

Here, however, the manifest indicates that service S2 depends on another service, S3, which has not yet been instantiated. In response to this, the shell process for request 316 submits request 318 to tracker 302. Tracker 302 receives request 318 and determines that no suitable platform is currently available (perhaps because service S3 requires a high-bandwidth platform, or perhaps because all existing platforms are operating at capacity). Accordingly, tracker 302 communicates to provisioner 310 the need for, and requirements of, a new platform. Provisioner 310 then communicates with cloud-computing provider 308, causing it to spawn a new platform 326. This communication may be direct (as where virtual machine monitor is controlled directly by the system of the invention), or indirect (for example, via the API of a commercial cloud provider). In this example, launcher 328 is part of the virtual machine image for platform 326 spawned by cloud-computing provider 308 and is thus immediately available. In response to the creation of platform 326, tracker 302 communicates with launcher 328 the details of request 318. As depicted, platform 326 has no local cache, so launcher 328 fetches the necessary bundle, B3, from repository 312 and instantiates service S3.

As indicated in request 318, launcher 328 communicated to tracker 302 that service S3 has been started, and tracker 302 passes this information on to the shell process for request 316. Its dependencies now having been satisfied, service S2 can now be instantiated from bundle B2. This process continues indefinitely, with tracker 302 receiving requests and brokering them to the available platforms, which are created and destroyed as demand rises and falls.

Figure 4:
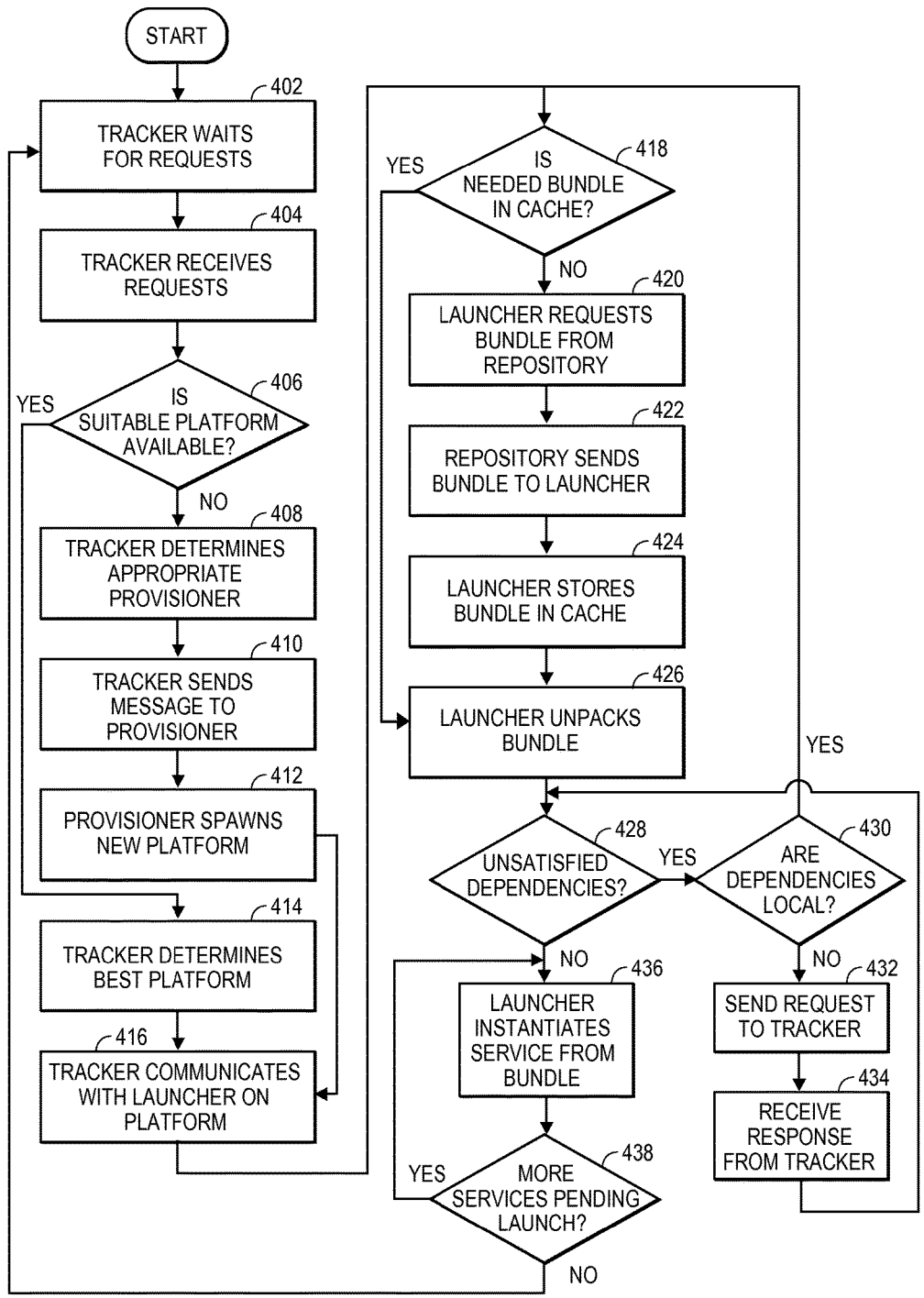
FIG. 4 depicts a flowchart illustrating the instantiation of a service of one embodiment of the invention.

Turning now to FIG. 4, a flowchart illustrating the instantiation of a service of one embodiment of the invention is depicted. Upon startup, a tracker (such a tracker 206) begins step 402, where it waits for incoming requests to instantiate a service. As discussed elsewhere, these requests can come from a variety of sources, including users, automated processes and other services. At step 404, the tracker receives a request such as request 314, 316, or 318, and examines the requirements for instantiating the requested service. In some embodiments, the request will include a particular version of the bundle to be used for instantiating the service; in other embodiments, the request will indicate a range of acceptable versions, such as a maximum version, a minimum version, or both. In still other embodiments, no bundle version information is included in the request. In some embodiments, one or more platform requirements are included with the request. Examples of such platform requirement are provided above.

Next, at decision 406, the tracker determines whether a suitable platform is available to instantiate the task. In some embodiments, this decision may be a determination of whether any platform meeting the service's requirements is available. In other embodiments, this determination may also involve comparing the load on one or more suitable platforms to their capacity and the estimated load of the new service. In still other embodiment, this determination may involve comparing the total capacity of all available platforms to the total anticipated load.

If it is determined that no suitable platform is available, processing continues at step 408, where the tracker selects a provisioner from the available provisioners. In some embodiments, only a single provisioner is available and this step is unnecessary. In other embodiments, different provisioners exist for different types of platforms. For example, an embodiment may have a separate provisioner for each commercial cloud service which can serve as a source of platforms, one or more provisioners for directly controlled virtual machine hosts, and a provisioner which is responsible for creating an interpreted platform form a non-interpreted platform by instantiating an interpreter. In such a case, the provisioner selected will depend on the requirements of the service to be instantiated and the properties of the platforms that each provisioner can spawn. Once the provisioner has been selected, the tracker communicates with the provisioner at step 410, instructing it to spawn a new platform. In some embodiments, this message also includes details as to the parameters of the platform to be spawned. In response, at step 412, the provisioner spawns a new platform. The details of spawning a new platform will vary depending on the type of platform to be spawned, but will be familiar to one skilled in the art.

If, on the other hand, it was determined at decision 406 that one or more suitable platforms exist, processing moves to step 414, where the tracker determines the best available platform. In some embodiments, this determination is simple, such as simply selecting the first suitable platform. In other embodiments, this determination is made by a complex algorithm to maximize the utilization of the available platform or minimize the processing time for the instantiated services. One algorithm suitable for determining the optimal target platform is discussed in greater detail below. Regardless of the determination at decision 406, processing then continues at step 416.

Once the target platform has been selected or spawned, the tracker communicates with the launcher running on the target platform at step 416. As discussed above, in some embodiment the launcher will not be a persistent process that instantiates all service on a particular platform, but rather a shell process that prepares a single service for instantiation and then instantiates the service in its place; subsequent services will have their own shell process. For the sake of brevity, "launcher" will refer to either a persistent launcher daemon or a short-lived launcher shell process. In some embodiments, the communication between the tracker and the launcher will indicate a bundle to be used for instantiating the service. In other embodiments, the launcher will select the bundle based on information communicated to it by the tracker; one example of this is where the tracker passes on maximum or minimum version requirements and the launcher selects the appropriate bundle version. In certain embodiments, the tracker will also communicate additional information to the launcher, necessary or helpful in instantiating the service.

Next, at decision 418, the launcher determines whether is has a copy of the appropriate bundle in a local cache. As discussed above, in some embodiments, the local cache will be directly attached to the target platform, while in other is will be shared across more than one platform. If the appropriate bundle is not present in the local cache, the launcher sends a request for the bundle to the repository (such as repository 228) at step 420. As discussed above, there may be a single repository or a plurality of repositories arranged in any of a variety of ways. As with the communication between the tracker and the launcher, in some embodiments, the launcher will provide a precise bundle version to the repository, while in other version it will provide some or no parameters and the repository will select the appropriate bundle. In any case, at step 422, the repository sends the appropriate bundle to the launcher. In some embodiments, the launcher stores any such bundle in the local cache at step 424 in order to avoid the necessity of re-fetching from the repository should the platform be called upon to instantiate the same service again. In other embodiments, bundles are stored in the local cache only if particular criteria are met. Such criteria can include the bundle being of the latest version, the bundle having been instantiated more than a threshold number of times, or the absence of a "no-cache" directive from the tracker, among others.

At this point, or if decision 418 determined that the appropriate bundle was present in the local cache, processing continues at step 426. There the launcher unpacks the bundle. In one embodiment, the bundle is an archive file containing the package (which may itself be an archive file) and the manifest. In another embodiment, the bundle is a single file that contains both package and manifest information and need not be unpacked. In still another embodiment, the bundle consists of multiple files, each of which may or may not need to be unpacked at this step. In some embodiments, services to be instantiated can depend on other services, either running locally or elsewhere on the system.

At decision 428, the launcher determines whether the service to be instantiated has an unsatisfied dependency. If so, processing proceeds to decision 430 to determine whether the unsatisfied dependency is local. If so, processing returns to decision 418 to begin the process of instantiating it. If the dependency is not local, the launcher sends a request to the tracker to instantiate the dependency service at step 432, and the launcher proceeds to step 434 to wait for the tracker to indicate that the dependency service has been instantiated, at which point processing return to decision 428 to check for additional unsatisfied dependencies. In some embodiments where the initial service to be instantiated has multiple dependencies, the launcher will additionally calculate any necessary ordering among them and reduce delay by instantiating them in parallel.

Finally, when decision 428 indicates that all dependencies have been satisfied, processing proceeds to step 436, where the launcher proceeds to instantiate the service from the bundle. Once the service has been instantiated, processing proceeds to decision 438, which checks to see if any additional services are pending instantiation. This may be the case, for example, where the service instantiated immediately prior at step 436 was a local dependency for the service indicated in the initial request. If additional services are pending instantiation, processing returns to step 436 until all pending services have been instantiated. When no services remain pending, processing returns to step 402 to await additional requests.

Figure 5:
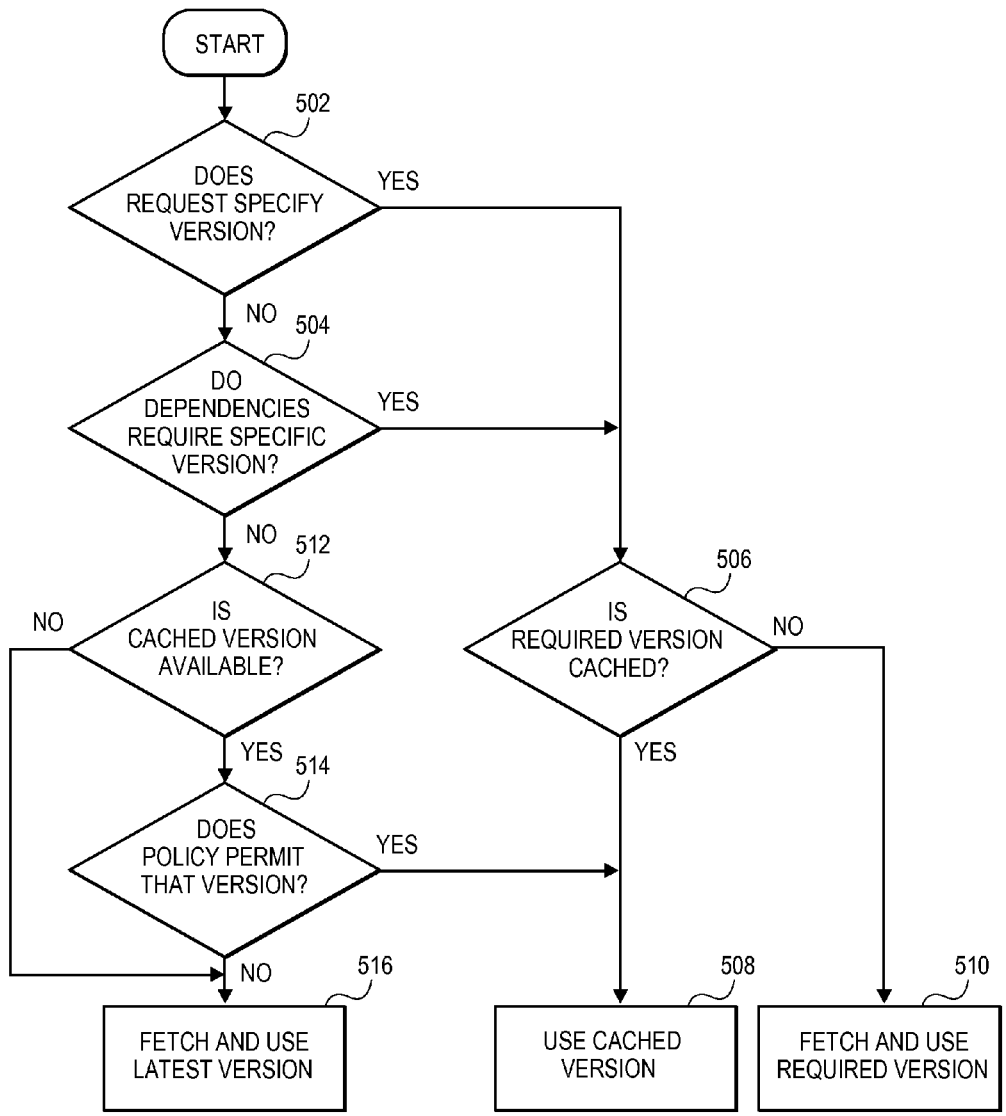
FIG. 5 depicts an exemplary method for selecting and fetching a particular version of a versioned bundle suitable for use with the invention.

Turning now to FIG. 5, an exemplary method for selecting and fetching a particular version of a versioned bundle is depicted. Initially, at decision 502, the method checks whether the request to instantiate the service specified a particular version. If no specific version was requested, or if the range of versions specified permits multiple versions, processing proceeds to decision 504. There, the method determines whether a service depending on the service to be instantiated requires a particular version. If so, if the range of versions supplied constrains the bundle to a particular version, or if decision 502 decided that a particular version was required, then processing proceeds to decision 506. There, the local cache is check to see if it contains a copy of the required version. If so, processing proceeds to step 508, where the cached version is instantiated and processing terminates. If the cache does not contain a copy of the required version of the bundle, processing proceeds to step 510, where the method fetches the required version from a repository such as repository 228, instantiates that version, and processing again terminates.

If decision 504 determines that multiple versions of the bundle can satisfy the request, processing proceeds to decision 512, which checks the local cache to see if some version of the requested bundle is present. If so, processing proceeds to decision 514. There, the method determines whether policy permits using the cached version. For example, a particular version could be blacklisted due to a known security vulnerability, or policy could require always using the most recent version of the bundle. If policy does so permit, processing continues at step 508, as previously described. If decision 512 determined that no cached version was available, or if decision 514 determined that policy prohibited using a cached version, processing proceeds at step 516. There, the method fetches the newest version of the bundle from a repository such as repository 228, instantiates that version, and processing terminates.

Turning now to FIG. 6, an alternate view of a network architecture suitable for practicing certain embodiments of the invention is depicted. Many components of FIG. 6 correspond to those of FIG. 2, which will be pointed out as they are described. As opposed to FIG. 2, which emphasized the process of instantiating services, FIG. 6 focuses on the step of selecting the optimal platform. To emphasize their individual capabilities and limitations, platforms are referred to as computing resources in this discussion. User 602 and computer 604 correspond to user 202 and computer 204. Scheduler 606 provides functionality used by tracker 206 and, in some embodiments, is co-located with it. In other embodiments, scheduler 606 is integrated with tracker 206, while in still others, it is completely separated and provided scheduling functionality remotely to tracker 206. Computing resources 608, 610 and 612 correspond to platforms such as platform 210, 212 and 214. Although FIG. 6 depicts direct network connections between scheduler 606 and computing resources 608, 610 and 612, such connections will not necessarily be present, particularly in embodiments where the scheduler and the tracker are not co-located.

In this exemplary network architecture, computing resource 610 has a direct, local connection to data store 614, which stores data used as input by the tasks described below. Computer 604 also has locally stored input data at data store 616. Additionally, computing resource 610 is connected to computing resource 608 by a 1 Gb/s network connection, to computing resource 612 by a 10 Mb/s network connection, and to computer 604 by a 10 Mb/s network connection. Computing resource 612 is additionally connected to computer 604 by a 100 Mb/s network connection.

A person having ordinary skill in the art will appreciate that the throughput of a network connection may not reach its theoretical maximum due to protocol overhead, congestion, and other factors, and may vary over time. In some embodiments of the invention, theoretical network throughputs are used to calculate transfer times. In other embodiments, constant network throughputs based on observed values are used. In still other embodiments, time-varying throughputs based on link utilization and other factors are used. A person of skill in the art will appreciate that the many other techniques known in the art for estimating constant or time-varying link throughput can be employed for transfer time calculations. Similarly, where multiple network links must be traversed, several algorithms can be used for estimating the transfer time over the full path. In one embodiment, the transfer time over the individual links is summed to provide the total transfer time. In another embodiment, the transfer time over the slowest link is used. A person of skill in the art will appreciate that the appropriate algorithm to use will depend on the implementation details and be able to choose an algorithm accordingly.

In this exemplary network architecture, computing resource 608 has three CPU cores, computing resource 610 has two CPU cores and computing resource 612 has a single CPU core. For the purposes of the examples below, it is assumed that the time for a task to complete on a given resource is directly proportional to the size of the input data to be processed and inversely proportional to the number of cores available on the computing resource, and it is also assumed that the amount of output data produced by a task is known in advance. A person of skill in the art will appreciate that computation time and output data size may not be known in advance. In one embodiment of the scheduling algorithm described here, these simplifying assumptions are used. In another, empirical data about the past computation times and output sizes is used. In still another embodiment, complexity theory can be used to provide estimates for these values based on domain-specific information about the task to be executed. In yet another embodiment, a hybrid of the previously described techniques is used. A person of skill in the art will understand that the algorithm can employ any of the techniques known in the field for estimating these values.

Turning now to FIG. 7, a variety of task allocations generated by one embodiment of the invention operating in the environment of FIG. 6 are depicted. Shown first, in FIG. 7(*a*), are alternate calculations of a time metric for a task that requires 1 GB of input data, which is initially stored at data store 616, where the computation time is 1000 core-seconds, and where the task size and output size are both negligible. If this task were executed at competing resource 608, the transfer time would be 800 s (note that the bottleneck link is 10 Mb/s), and the computation time would be 333 seconds (due to the three cores at computation resource 608), for a total time metric of 1133. Similarly, if this task were to be executed at computing resource 610, the transfer time would be 800 s and the computation time would be 500 s, for a time metric of 1300. Finally, if this task were to be executed at computing resource 612, the transfer time would be 80 s and the computation time would be 1000 s for a total time metric of 1080. Thus, absent other scheduling constraints, this task would be scheduled at computing resource 612. Note that a naive approach, considering only the computation time, would select computing resource 608, resulting in a longer overall time until completion.

The next example, shown in FIG. 7(b), depicts alternate calculations of a time metric for the same task, but with the input data stored initially at data store 614. Thus the transfer times change but the computation time remain the same. Here, executing the task at computing resource 608 results in the same computation time but a transfer time of only 8 s, for a total time metric of 341. Computing resource 610 has a transfer time of 0 s (since the data is already present), giving it a time metric equal to its computation time of 500 s. Finally, computing resource 612 has a dramatically increased transfer time of 800 s, giving it a time metric of 1800. This example shows that initial data placement can significantly alter the optimal task allocation, and also that an approach which only considers transfer time is no more adequate than one that only considers computation time.

Another example, shown in FIG. 7(c), considers that case where the input data again starts at data store 616, but where the task also produces output of size 1 GB which must be transferred to computer 604 when computation completes. Again the computation times remain unchanged, but the need to transmit output results to the user alters the transfer times. In this case, computing resource 608 has a total transfer time of 1600 s (800 s to transfer the input data to computing resource 608, and 800 s to transfer the output data to computer 604), and therefore a time metric of 1933. Computing resource 610 also has a transfer time of 1600 s in this scenario for a time metric of 2100. Due to its higher-bandwidth connection to computer resource 604, computing resource 612 has a transfer time of 160 s, and therefore a time metric of 1160. Observe that this additional requirement to transfer the output data back to the user again changes the optimal task allocation.

A more complex task allocation example is depicted in FIGS. 7(d) and 7(e). In this scenario, there are three tasks: task A has a task size of 10 MB, uses 1 GB of input data, requires 120 core-seconds to execute and produces 10 GB of output data. Task B also has a task size of 10 MB, consumes the 10 GB of data produced by task A, requires 30 core-seconds to execute and produces 100 MB of output data that must be transferred to computer 604 when the task is complete. Task C has a task size of 100 MB, uses 100 MB of input data, requires 30 core-seconds to execute and produces 10 MB of data that must be transferred to computer 604 when the task is complete. In the example of FIG. 7(d), the tasks are stored at computer 604 and the input data is stored at data store 616. These requirements are summarized in Table 1.

TABLE 1

| Task | Task size | Task At | Input Size | Input At | Output Size | Output To |
|------|-----------|---------|------------|----------|-------------|-----------|
| A | 10 MB | 604 | 1 GB | 616 | 10 GB | to B |
| B | 10 MB | 604 | 10 GB | from A | 100 MB | 604 |
| C | 100 MB | 604 | 100 MB | 616 | 10 MB | 604 |

Given this set of tasks to allocate, the first step is selecting a task to allocate first. A person of skill in the art will appreciate that there are a large number of heuristics for task ordering, which can be used as appropriate. For example, one embodiment of the invention might employ FIFO (first-in, first-out) ordering, while another might order based on computation time. Still other embodiments might use heuristics such as scheduling the job with the largest amount of data to process first. Certain embodiments will have additional scheduling constraints that inform the order of selection, such as task deadlines. Such embodiments may use scheduling heuristics such as Earliest Deadline First or Shortest Job First.

In this example, task A is scheduled first. If executed on computing resource 608, task A has a transfer time of 808 s (8 s to transfer the task and 800 s to transfer the input data; transferring the output data will be computed as input data transfer time for task B) and a computation time of 40 s, for a time metric of 848. If executed on computing resource 610, the transfer time remains 808 s, but the computation time becomes 60 s, giving a time metric of 868. If executed on computing resource 612, the transfer time becomes 80.8 s (0.8 s to transfer the task and 80 s to transfer the data), and the computation time is 120 s, giving a total time metric of 200.8. In this embodiment, tasks are scheduled one at a time with the lowest time metric chosen at each step; thus, task A is allocated to computing resource 612. This allocation is depicted in FIG. 7(d).

Task B is scheduled next. This is more complicated than scheduling task A because of the dependency of task B on task A. Because task B cannot begin executing until task A has completed, the transfer time for task B is reduced because it can be transferred while task A is executing. Therefore, only the time to transfer the input data and the time to transfer the output data for task B need to be included in its transfer time. If executed on computing resource 608, the transfer time is 8080 s, consisting of 8000 s to transfer the output data of A (which is the input data of task B) to computing resource 608 and 80 s to transfer the output data of task B to computer 604. The execution time is 10 s, for a total time metric of 8090. If executed on computing resource 610, the transfer time remains unchanged (due to the high-capacity link between computing resources 608 and 610), and the computation time increases to 15 s, for a total time metric of 8095. Finally, if executed on computing resource 612, the transfer time becomes 8 s (no time is needed to transfer the input data because task B is executing on the same computing resource where task A generated it), and the computation time becomes 30 s, giving a total time metric of 38. Accordingly, task B is also scheduled on computing resource 612. This allocation is also depicted in FIG. 7(d). The scheduling of task B illustrates the desirability of moving tasks to their data rather than vice versa.

Finally, task C is scheduled. If executed on computing resource 608, the transfer time is calculated as 80 s to transfer the task, 80 s to transfer the input data, and 8 s to transfer the output data, giving a total transfer time of 168 s. An execution time of 10 s gives a total time metric of 178. If executed on computing resource 610, the transfer time remains 168 s, but the execution time increases to 15 s, giving a total time metric of 183. Calculating the time metric for computing resource 612 is more complicated because task C must contend for resources with tasks A and B. The time needed to transfer task C and the necessary input data is 16 s (8 s for each), but this cannot, in this embodiment, begin until the transferring of tasks A and B and the input data for task A have completed. In other embodiments, data transfer and execution can be multiplexed, and transfer and computation times are calculated accordingly. Here, however, the time to transfer task C and the necessary input data can be disregarded, as these transfers can be completed while task C is waiting for tasks A and B to complete. Thus the transfer time consists solely of the time to transfer the output of task C to computer 604, or 0.8 s. The calculation of the computation time, however includes not only the 30 s needed to execute task C but also the 238.8 s spent waiting for computing resource 612 to finish executing tasks A and B and become available. The total time metric for task C executing on computing resource 612 is therefore 269.6. Task C is accordingly scheduled on computing resource 608, as depicted in FIG. 7(*d*).

Note that the order in which the tasks are scheduled can change the resulting task allocation. If task C had been scheduled first in the above allocation, it would have been allocated to computing resource 612 and executed first, resulting in an earlier completion of task C but a delayed completion time for tasks A and B. In some embodiments, task reordering is performed to lower the aggregate completion time or the completion times of high-priority tasks.

In FIG. 7(*e*), a similar scenario is depicted, but in this instance, the initial input data is stored at data store 614 rather than data store 616. The task information is summarized in Table 2:

TABLE 2

| Task | Task size | Task At | Input Size | Input At | Output Size | Output To |
|------|-----------|---------|------------|----------|-------------|-----------|
| A'   | 10 MB     | 604     | 1 GB       | 614      | 10 GB       | to B'     |
| B'   | 10 MB     | 604     | 10 GB      | from A'  | 100 MB      | 604       |
| C'   | 100 MB    | 604     | 100 MB     | 614      | 10 MB       | 604       |

Again, in this embodiment, task A' is scheduled first. If executed on computing resource 608, task A' must transfer the task from computer 604, taking 8 s, and the input data must be transferred from data store 614, also taking 8 s. In some embodiments, these transfers can be conducted simultaneously such that only 8.08 s total is required. Again, the time to transfer the output data will be considered when scheduling task B'. The computation time if executed on computing resource 608 is 40 s, for a total time metric of 56. If task A' is executed on computing resource 610, the transfer time consists only of the 8 s needed to transfer the task from computer 604. The computation time on computing resource 610 is 60 s, for a total time metric of 68. If task A' is executed on computing resource 612, the time needed to transfer the task decreases to 0.8 s, but the time needed to transfer the input data increases to 800 s, and the computation time increases to 120 s, for a total time metric of 920.8. Accordingly, task A' is allocated to computing resource 608. This allocation is depicted in FIG. 7(*e*).

Task B' is again scheduled next. If task B' is executed on computing resource 608, the time needed to transfer the data is zero, and the time needed to transfer the task is 8 s. However, transferring the task can be done in parallel with execution of task A', which must complete before B' can begin executing, so this time can be disregarded. The time needed to transfer the output data to computer 604 is 80 s, for a total transfer time of 80 s. The computation time on computing resource 608 is 10 s, for a total time metric of 90. If task B' is executed on computing resource 610, the time to transfer the task is still 8 s and the time to transfer the output data is still 80 s, but the time to transfer the input data is 80 s, for a total time metric of 168. Finally, if task B' is executed on computing resource 612, the task can be transferred in 0.8 s, and the output data can be transferred in 8 s, but the time to transfer the input data increases to 8000 s, for a total transfer time of 8080.8 s. The execution time is 120 s, for a total time metric of 8200.8. Accordingly, Task B' is allocated to computing resource 608, as shown in FIG. 7(*e*).

Finally, task C' is scheduled. If executed on computing resource 608, the task takes 80 s to transfer and the input data takes 0.8 s to transfer, while the output data takes 8 s to transfer for a transfer time of 88.8 s; however, since tasks A' and B' are also transferring data, the transfer time must be increased by the 16 s the link between computer 604 and computing resource 608 is in use, for a total transfer time of 106.8 s. The execution time on computing resource 608 is 10 s, and while the execution time would normally be increased by the time spent waiting for tasks A' and B' to finish execution, by the time task C' finishes transferring, tasks A' and B' have finished executing and the computation time remains 10 s, for a total time metric of 116.8. If task C' is executed on computing resource 610, the input data does not needed to be transferred, so the transfer time consists only of the 80 s to transfer the task and the 8 s to transfer the output data, for a transfer time of 88 s; however, this transfer time must again be increased by 16 s to account for the link between computer 604 and computing resource 610 being used to transfer tasks A' and B' to computing resource 608, resulting in a total transfer time of 106 s. In some embodiments, transferring (and executing) tasks can be reordered once the tasks have been allocated to a computing resource so as to maximize the multiplexing of transfer with processing. The computation time of task C' on computing resource 610 is 15 s, giving a total time metric of 121. If task C' is executed on computing resource 612, the transfer time is 8 s for the task and 80 s for the input data; however, since these transfers are occurring over different links, they can be executed in parallel, taking only 80 s. Transferring the output data to computer 604 takes 0.8 s, for a total transfer time of 80.8 s. Executing the task on computing resource 612 takes 30 s, for a total time metric of 110.8, and task C' is accordingly allocated to computing resource 612, as shown in FIG. 7(*e*).

Turning now to FIG. 8, flowchart illustrating the operation of the task allocator of one embodiment of the invention is depicted. Initially, at step 802, the scheduler (also referred to as the task allocator) receives one or more task specifications. In one embodiment, task specifications are received individually and scheduled on a first-in, first-out basis. In another embodiment, task specifications are accumulated until a threshold, either of time or of number of tasks, has been reached, and then the scheduler allocates those tasks in a single allocation run. In still another embodiment, a group of tasks is received together, which are allocated in a single allocation run. In a first embodiment, the task specification indicates only the task to be executed, and the information needed to determine the time metric is gathered and/or estimated by the task allocator or related components. In another embodiment, the user or service requesting that the task be run provides information such as expected computation size, size of input data, and estimated size of output data to be used to determine the time metrics for the task. In still another embodiment, the user or service requesting that the task be executed provides a portion of the information used to determine the time metrics and another portion is gathered and/or estimated by the task allocator or related components.

Once all of the task specifications to be allocated have been received, processing proceeds to step 804 where a task to be allocated is selected. As discussed above, the order in which tasks are allocated can affect the schedule and aggregate completion time for all tasks. Accordingly, embodiments may use a variety of heuristics to choose the order in which tasks are allocated, including Shortest Job First, Longest Job First, Most Data First, Least Data First, and so on. Furthermore, if the task specification includes additional information such as deadlines or priority levels for tasks, additional heuristics such as Highest Priority First or Earliest Deadline First may be used. In some embodiments where deadline information is provided, the task allocator may defer executing tasks on the chosen computing resources until the entire task grouping has been allocated to determine if the allocation is one which allows all deadlines to be met, and restart the allocation process with a different allocation order if not.

Once a task to allocate has been selected, processing proceeds to step 806, where a list of viable computation resources is compiled. In some embodiments, the task allocator maintains a list of presently available computation resources, and determines the viable computation resources by selecting those presently available computation resources that meet the task requirements. In another embodiment, the task allocator compiles the list of viable computation resources by searching the available networks and cloud service providers for computation resources that meet the task requirements. As discussed above, task requirements can take a variety of forms, including platform type or hardware capabilities. As a part of the process of compiling the list of viable computation resources, additional computation resources may be spawned, either due to a lack of viable computation resources for the task or because of an increase in demand for computation resources (in general or of a particular type).

Once a list of viable computation resources has been compiled, processing proceeds to step 808, wherein a viable computation resource to evaluate for the task is chosen. Since the time metrics for all viable computation resources evaluated are compared prior to task execution, the order in which viable computation resources is evaluated is generally not of great import.

Once a computation resource to evaluate for the chosen task has been selected, processing proceeds to step 810, where the time to transfer the task to the computation resource being evaluated is determined. In some embodiments, this task will be provided by (and therefore transferred from) the user of service requesting the task. In other embodiment, tasks are stored as bundles in central repositories, and may be cached locally, as discussed above. In some embodiments, tasks may be stored at multiple locations, and the best location to transfer the task from is used in determining the task transfer time. In some embodiments where, as discussed above, multiple versions of the bundle corresponding to the task are available, the version of the bundle with the lowest transfer time may be preferred. In some embodiments, theoretical network link capacity is used to determine transfer times. In other embodiments, observed link throughput is used to determine transfer times. In still other embodiments, one of these techniques is modified by estimating link contention among allocated tasks.

Once the time to transfer the bundle is determined, processing proceeds to step 812, where the time to transfer the input data is determined. The input data may be the output of another task being scheduled, it may be provided by the user or service requesting the task, or it may be stored elsewhere on a connected network. In certain cases, such as that of data stored on a content distribution network, the input data may be available from multiple locations, and the best location for the computation resource being evaluated must be determined. In some cases, such as where a task providing the data has already been allocated, the time to transfer data between tasks is calculated as part of the input data transfer time for the consuming task. In other cases, such as where the task providing the data has not yet been allocated, the time to transfer data between tasks is calculated as part of the output transfer time for the producing task. For some tasks, no input data is required. Next, at step 814, the time to transfer the output data is determined. As discussed above with relation to input data, output data might flow to a particular location, or there might be multiple permissible output locations. For some tasks, no output data is produced.

Processing then proceeds to step 816, where other factors affecting transfer time are determined. In one embodiment, time spent waiting for input data to be generated is such a factor. In another embodiment, link contention among allocated tasks is such a factor. In yet another embodiment, time spent compressing the data prior to transmission and decompressing it on receipt are such a factor. Furthermore, if the task and input data are being received from different locations, an ability to receive them simultaneously may be another such factor. Other factors affecting transmission time will be apparent to a person of skill in the art.

At this point, processing proceeds to step 818, where the transfer time for the task being allocated and the computing resource being allocated is calculated. This calculation is based on some or all of the results of steps 810-816. In one embodiment, the results of steps 810-816 are summed together to obtain the transfer time. In other embodiments, only some of the results are summed. In still other embodiments, the results of step 816 are multiplied by the sum of the results of steps 810-814. In yet other embodiments, additional inputs in combination with these results are used in calculating the transfer time.

Next, processing proceeds to step 820, where the time to execute the task to be allocated on the computation resource being evaluated is determined. In one embodiment, this determination is made based on information provided by the user or service requesting the task. In another embodiment, this determination is based on the hardware capabilities of the computation resource. In still another embodiment, it is made based on the time taken to previously execute this (or a similar) task. In yet another embodiment, it is made based on a combination of some or all of the above techniques.

Once the execution time has been calculated, processing proceeds to step 822, where the time spent waiting for the computing resource to become available is determined. In some embodiments, this delay is due to other tasks being executed first or concurrently. In other embodiments, this delay results in the need to wait for a new computing resource to spawn. Processing then proceeds to step 824, where other factors affecting computation time are determined. In one embodiment, I/O constraints related to the data being processed are such a factor. In another embodiment, the desirability of operating at reduced clock speed (for example, to reduce power consumption) is included. Other factors affecting computation time will be readily apparent to a person of skill in the art.

Processing then proceeds to step 826, where the computation time for the task being allocated on the computation resource being evaluated is calculated. This calculation is based on some or all of the results of steps 820-824. In one embodiment, the results of steps 820-824 are summed together to obtain the computation time. In another embodiment, only some of the results are summed. In still another embodiment, the results of step 824 are multiplied by the sum of the results of steps 820 and 822. In yet other embodiments, additional inputs in combination with these results are used in calculating the transfer time.

Next, at step 828 the time metric for the task being allocated and the computation resource being evaluated is calculated. This calculation is based on the transfer time and the computation time for the task and computation resource. In some embodiments, this calculation is performed by summing the transfer time and the computation time. In other embodiments, a weighted sum of the transfer time and computation time is used. In still other embodiments, other inputs are also considered in this calculation.

Once the time metric for the task being allocated and the computation resource has been computed, processing proceeds to decision 830 to determine if there are additional computation resources to be evaluated. If so, processing returns to step 808. If not processing proceeds to step 832. In some embodiments, processing may proceed to step 832 even if viable computation resources remain unevaluated. For example, if the time metric is below a threshold, there may be no need to evaluate additional computation resources. For another example, it may be desirable to limit evaluation to a maximum number of computation resources. For yet another example, there may be no need to evaluate multiple identical computation resources.

At step 832, a computation resource for the task being allocated is selected based on the time metrics for that task. In one embodiment, the computation resource with the lowest time metric is chosen. In another embodiment, the computation resource that will lower the aggregate time metric across all tasks being allocated is chosen. Once a computation resource is selected, processing proceeds to step 834 where the task being allocated is executed on the chosen computation resource, as described elsewhere. In some embodiments, this step is deferred until all tasks have been allocated to allow for task reordering if necessary. Finally, processing proceeds to decision 836, where it is determined whether task remain to allocate. If so, processing returns to step 804 to allocate the remaining tasks; otherwise, processing returns to step 802 to await additional task specifications.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

Having thus described various embodiments of the invention, what is claimed as new and desired to be protected by Letters Patent includes the following:

1. One or more non-transitory computer readable media, said media containing computer-executable instructions which, when executed, perform a method for dynamically instantiating services comprising the steps of:
receiving a request to instantiate a service;
determining a target platform of a plurality of target platforms, said target platform running a launcher, wherein said launcher is a persistent service running on said target platform, and wherein each target platform includes a separate launcher;
wherein said target platform is determined based at least in part on one or more requirements for the service, said requirements including a bandwidth available for the target platform and a computation capacity available for the target platform;
determining that a suitable target platform does not exist;
spawning a new target platform;
using the new target platform as the target platform for instantiating the service;
selecting a bundle based on the service to be instantiated, wherein the bundle comprises one or more service execution files and a manifest including metadata for the bundle; and
transmitting a message to the launcher running on the target platform, said message indicating the selected bundle and causing the launcher to instantiate the service on the target platform from the selected bundle.

2. The media of claim 1, wherein the message causes the launcher to retrieve the selected bundle from a repository.

3. The media of claim 2, wherein:
the repository stores a plurality of versions of the selected bundle;
the message includes an indicated version of the plurality of versions of the selected bundle; and
the bundle retrieved by the launcher is of the indicated version.

4. The media of claim 1, wherein the requirements further include at least one of a required operating system, a minimum number of CPU cores, a minimum amount of available RAM, an available GPU, and local storage storing data to be processed.

5. The media of claim 1, wherein spawning the new platform comprises causing a new virtual machine running the launcher to be instantiated.

6. The media of claim 1, wherein the message causes the launcher to determine that the selected bundle is present in a local cache and retrieve the selected bundle from the local cache.

7. One or more non-transitory computer readable media, said media containing computer-executable instructions which, when executed, perform a method for the allocation of tasks among computation resources, said method comprising the steps of:
receiving a task specification including an indication of a bundle,
wherein the bundle comprises one or more service execution files and a manifest including metadata for the bundle;
for each computation resource of a plurality of computation resources, each computation resource including a separate launcher, calculating a time metric for the specified task on the computation resource, said time metric incorporating a computation time and a transfer time,
wherein the transfer time includes the time necessary to transfer the task to the computation resource, the time necessary to transfer any input data needed for the task to the computation resource, and the time needed to transfer the resulting output data from the computing resource;
determining a chosen computation resource of the plurality of computation resources based on the time metric calculated for each computation resource of the plurality of computation resources determining that no suitable computing resource exists;
spawning a new computing resource;
using the new computing resource as the chosen computation resource for instantiating the service;
selecting a bundle based on the service to be instantiated;
transmitting a message to a launcher, said message indicating the selected bundle; and
executing the specified task on the chosen computation resource via the launcher executing as a persistent service on the chosen computation resource.

8. The media of claim 7, wherein the time needed to transfer the resulting output data from the computing resource is determined based on a prior execution of the task.

9. The media of claim 7, wherein the computation time includes the time necessary to execute the task on the computation resource and the time spent waiting for the computation resource to become available.

10. The media of claim 9, wherein the time necessary to execute the task on the computation resource is determined using a prior execution of the task.

11. The media of claim 7, wherein the time metric further incorporates a platform requirement of the specified task.

12. The media of claim 7, wherein the chosen computation resource is chosen so as to minimize one of a time metric for the specified task and an aggregate time metric across a plurality of tasks being allocated.

13. One or more non-transitory computer readable media, said media containing computer-executable instructions which, when executed, perform a method for allocating dynamically instantiated services among computing resources comprising the steps of:
receiving a request to instantiate a service, said request including a task specification for said service;
for each computation resource of a plurality of computation resources, each computation resource including a separate launcher, calculating a time metric for the specified task on the computation resource, said time metric incorporating a computation time and a transfer time,
wherein the transfer time includes the time necessary to transfer the task to the computation resource, the time necessary to transfer any input data needed for the task to the computation resource, and the time needed to transfer the resulting output data from the computing resource;
determining a chosen computation resource of the plurality of computation resources based on the time metric calculated for each computation resource of the plurality of computation resources;
determining that no suitable computing resource exists;
spawning a new computing resource;
using the new computing resource as the chosen computation resource for instantiating the service;
selecting a bundle based on the service to be instantiated,
wherein the bundle comprises one or more service execution files and a manifest including metadata for the bundle; and
transmitting a message to a launcher running on the chosen computation resource, said message indicating the selected bundle and causing the launcher to instantiate the service on the chosen computation resource from the selected bundle,
wherein said launcher is a persistent service running on the chosen computation resource.

14. The media of claim 13, wherein the bundle is also selected based on the chosen computation resource.

15. The media of claim 13, further comprising the step of eliminating from consideration any computation resource that fails to meet a platform requirement of the task specification.

16. The media of claim 13, wherein the message causes the launcher to retrieve the selected bundle from a repository.

* * * * *